(12) United States Patent
Smithson et al.

(10) Patent No.: US 10,059,423 B2
(45) Date of Patent: Aug. 28, 2018

(54) PANEL ASSEMBLY WITH CRUSH SECTION

(71) Applicant: Zodiac Seats US LLC, Gainesville, TX (US)

(72) Inventors: Tyler Smithson, Huntington Beach, CA (US); Rakibul Islam, Huntington Beach, CA (US); Richard Morrison, Huntington Beach, CA (US); Monique Le Roux, Gainesville, TX (US); Aamir Jafri, Gainesville, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 451 days.

(21) Appl. No.: 14/788,255

(22) Filed: Jun. 30, 2015

(65) Prior Publication Data

US 2015/0375844 A1    Dec. 31, 2015

Related U.S. Application Data

(60) Provisional application No. 62/019,307, filed on Jun. 30, 2014.

(51) Int. Cl.
*B64C 1/06*    (2006.01)
*B64D 11/00*   (2006.01)
(Continued)

(52) U.S. Cl.
CPC ............. *B64C 1/066* (2013.01); *B32B 3/12* (2013.01); *B32B 5/024* (2013.01); *B32B 5/22* (2013.01);
(Continued)

(58) Field of Classification Search
CPC ..... B64C 1/066; B64D 11/0023; B64D 11/00; B32B 3/12; B32B 29/02; B32B 5/26;
(Continued)

(56) References Cited

U.S. PATENT DOCUMENTS 5,482,230 A    1/1996  Bird
5,649,721 A    7/1997  Stafford
(Continued)

FOREIGN PATENT DOCUMENTS

DE    19607025 A1    8/1997
DE    19730961 A1    1/1999
(Continued)

OTHER PUBLICATIONS

Machine Translation of JP 2009-286817 (Year: 2009).*
(Continued)

*Primary Examiner* — Brian Handville
(74) *Attorney, Agent, or Firm* — Kilpatrick Townsend & Stockton LLP; Dean W. Russell; Davidson G. Lucas (57) ABSTRACT

A panel assembly that includes a front skin having a front surface, a back surface and at least one crush section portion, a core assembly that includes first, second, third, fourth and fifth layers laminated together, and at least a first crush section. The first, second, third, fourth and fifth layers each include a front surface, a back surface and at least one crush section portion. The front surface of the first layer of the core assembly includes a plurality of scores defined therein. The second layer includes a plurality of elongated voids defined therein and the fourth layer includes a plurality of elongated voids defined therein.

22 Claims, 6 Drawing Sheets

(51) Int. Cl.
 B32B 5/02 (2006.01)
 B32B 5/24 (2006.01)
 B32B 5/22 (2006.01)
 B32B 5/26 (2006.01)
 B32B 29/02 (2006.01)
 B32B 3/12 (2006.01)
(52) U.S. Cl.
 CPC ............... *B32B 5/24* (2013.01); *B32B 5/26* (2013.01); *B32B 29/02* (2013.01); *B64D 11/00* (2013.01); *B64D 11/0023* (2013.01); *B32B 2255/26* (2013.01); *B32B 2260/021* (2013.01); *B32B 2260/046* (2013.01); *B32B 2262/0269* (2013.01); *B32B 2262/101* (2013.01); *B32B 2307/554* (2013.01); *B32B 2307/58* (2013.01); *B32B 2307/5825* (2013.01); *B32B 2307/72* (2013.01); *B32B 2605/00* (2013.01); *B32B 2605/18* (2013.01)
(58) Field of Classification Search
 CPC .. B32B 5/22; B32B 5/24; B32B 5/024; B32B 2262/0269; B32B 2605/18; B32B 2307/72; B32B 2307/5825; B32B 2307/58; B32B 2307/554; B32B 2262/101; B32B 2260/046; B32B 2260/021; B32B 2255/26; B32B 2605/00
 USPC .................................................. 244/121, 133
 See application file for complete search history.

(56) References Cited

U.S. PATENT DOCUMENTS

| 9,086,110 B2 | 7/2015 | Guimard |
| 2001/0054814 A1 | 12/2001 | Yata |
| 2002/0018901 A1 | 2/2002 | Cunningham |

FOREIGN PATENT DOCUMENTS

| JP | 2009-286817 A | 6/2015 |
| WO | 93/01088 | 1/1993 |

OTHER PUBLICATIONS

International Preliminary Report on Patentability, PCT Patent Application No. PCT/US2015/038650, dated Jan. 3, 2017.
International Search Report and Written Opinion issued in PCT/US15/38650 dated Dec. 23, 2015.
Europe Patent Application No. 15814126.7, Search Report dated Jan. 22, 2018.

* cited by examiner

PANEL ASSEMBLY WITH CRUSH SECTION

CROSS REFERENCE TO RELATED APPLICATIONS

This application claims the benefit of U.S. Provisional Application No. 62/019,307, filed Jun. 30, 2014, which is incorporated by reference herein in its entirety.

FIELD OF THE INVENTION

The present invention relates generally to a panel for use in a vehicle interior, and more particularly to a panel for use in an aircraft interior that absorbs energy in the case of a crash.

BACKGROUND OF THE INVENTION

Passenger safety in moving vehicles, such as aircraft, buses, trains, etc. is of utmost importance. For example, within aircraft, there exist impact susceptible areas where a passenger may strike their head in the event of a crash. These impact susceptible areas are often on monuments and bulkheads, etc. that are positioned in front of a passenger seat. A need exists for constructing the monuments, etc. in these positions out of a material that can better protect passenegers.

SUMMARY OF THE PREFERRED EMBODIMENTS

In accordance with an aspect of the present invention there is provided a panel assembly that includes a front skin having a front surface, a back surface and at least one crush section portion, a core assembly that includes first, second, third, fourth and fifth layers laminated together, and at least a first crush section. The first, second, third, fourth and fifth layers each include a front surface, a back surface and at least one crush section portion. The front surface of the first layer of the core assembly includes a plurality of scores defined therein. The second layer includes a plurality of elongated voids defined therein and the fourth layer includes a plurality of elongated voids defined therein. In a preferred embodiment, within the first crush section, the front skin includes a cut pattern that comprises a plurality of horizontal and vertical cuts formed therein. Preferably, the plurality of horizontal and vertical cuts form a plurality of rows and columns. Preferably, each row includes alternating horizontal and vertical cuts and each column includes alternating horizontal and vertical cuts. In a preferred embodiment, the front skin includes a glass weave layer and a surface finish layer, and the horizontal and vertical cuts are made in the glass weave layer.

In a preferred embodiment, the plurality of scores in the front layer of the first layer are positioned within the crush section portion, and they extend generally parallel to one another and in a horizontal orientation. Preferably, the plurality of elongated voids in the fourth layer are staggered vertically from the plurality of elongated voids in the second layer. Preferably, the panel assembly 10 includes a second crush section defined therein that is separated horizontally from the first crush section by a non-crush section. In a preferred embodiment, the panel assembly includes at least a first extended crush section that includes a second cut pattern that comprises a plurality of horizontal and vertical cuts formed therein, and wherein the horizontal and vertical cuts of the second cut pattern are not as dense as the horizontal and vertical cuts in the first cut pattern.

In accordance with another aspect of the present invention there is provided a panel assembly that includes a front skin having a front surface, a back surface and at least one crush section portion, a core assembly that includes at least a first layer, and at least a first crush section. The first layer has a front surface, a back surface and at least one crush section portion. The front surface of the first layer includes a plurality of scores defined therein.

In accordance with another aspect of the present invention there is provided a method of forming a panel assembly. The method includes providing a prepreg sheet, forming a cut pattern in the prepreg sheet, heat-treating the prepreg sheet to form a front skin layer having a front surface and a back surface, providing a first layer of a core assembly, forming a plurality of scores in the front surface of the first layer, and bonding the back surface of the front skin layer to the front surface of the first layer. The method also preferably includes providing a second layer of the core assembly and forming a plurality of elongated voids therein, providing a third layer of the core assembly, providing a fourth layer of the core assembly, forming a plurality of elongated voids therein, and providing a fifth layer of the core assembly, and bonding the first to fifth layers together to form the core assembly.

In a preferred embodiment, the pre-preg stage cuts in the front skin make the fibers in the glass weave discontinuous while not affecting the resin finish surface so that abuse load resistance remains fairly high. The cut pattern also preferably allows lower impact crushing on the front compression surface and distributes energy in directions generally orthogonal to movement (which is desirable in a crash situation). The cut pattern provides in-plane crushing in the event of a crash can be applied within aircraft in areas such as galley counters and shelving to reduce the rigidity of the backing. In a preferred embodiment, the material of the core assembly is preferably a low density core with a thinner resin coating than standard honeycomb paper and crushes at a lower, more optimal rate for the type of energy absorption the inventor has found in quasi-static, inverted pendulum and 16 G sled tests and simulations. In a preferred embodiment, the core is made of nomex. However, this is not a limitation, and the core assembly can also be made of layers of standard honeycomb paper, crush core or other materials used in aircraft panels.

In an exemplary embodiment, first panel assembly described herein comprises an approximately two inch thick crushable panel to be placed against rigidly backed areas such as drink carts in a galley and the second panel assembly described herein comprises an approximately 0.5 inch panel with about three inches of clearance or modifiable stiffness behind as is found in closets, class dividers, first class and business class furniture and some split galleys.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-6 show a first embodiment of a panel assembly 10 in accordance with a preferred embodiment of the present invention. It will be appreciated that the panel assembly 10 can be used on a front row monument (bulkhead, class divider, etc.) in an aircraft and the description below uses this positioning as an example. However, this is not a limitation and the panel assembly 10 can be used on other vehicles and in other positions where passenger head impact is an issue.

Figure 1:
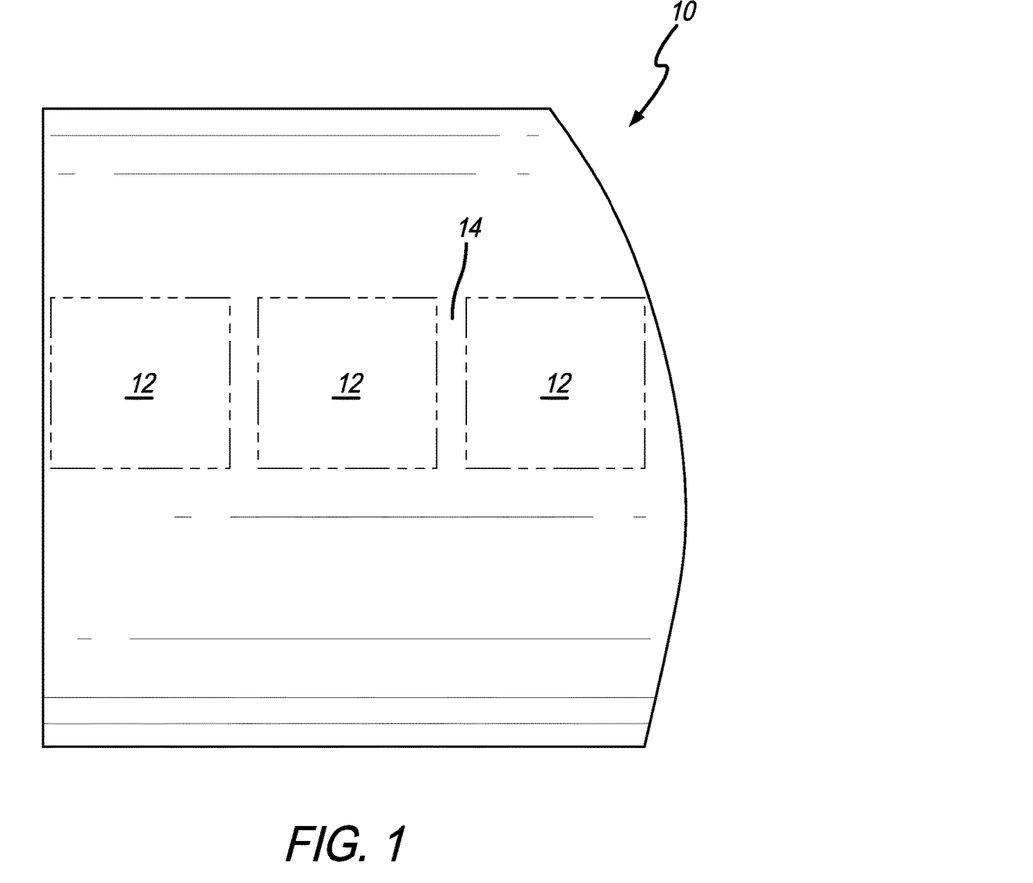
FIG. 1 is a front elevational view of a panel assembly in accordance with a preferred embodiment of the present invention.

As shown in FIG. 1, in a preferred embodiment, the panel assembly 10 includes first, second and third crush sections 12 that are separated by vertically extending non-crush sections 14. The crush sections 12 are positioned in a high probability area for head strikes by three front row passengers in the event of a crash. It will be appreciated that the border of the crush sections 12 are shown in phantom lines to give an idea of where the crush sections are located 12. However, in a preferred embodiment, the crush sections 12 are created so that they are not readily apparent to a passenger seated in the front row adjacent the panel assembly 10 or monument, as described below. In use, the panel assembly 10 is typically secured to a rigid wall 100. In another embodiment, the panel assembly 10 is positioned close to a rigid wall with little clearance therebetween.

Figure 4:
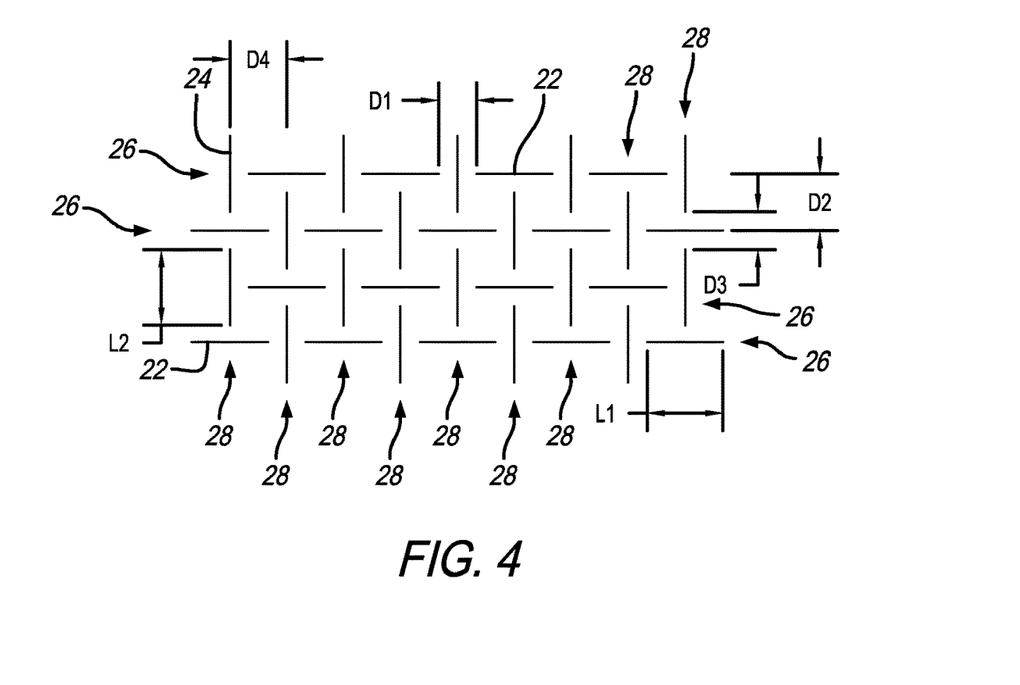
FIG. 4 is a schematic view of the cut pattern in the front skin of the of the crush section of the panel assembly of FIG. 1.
Figure 5:
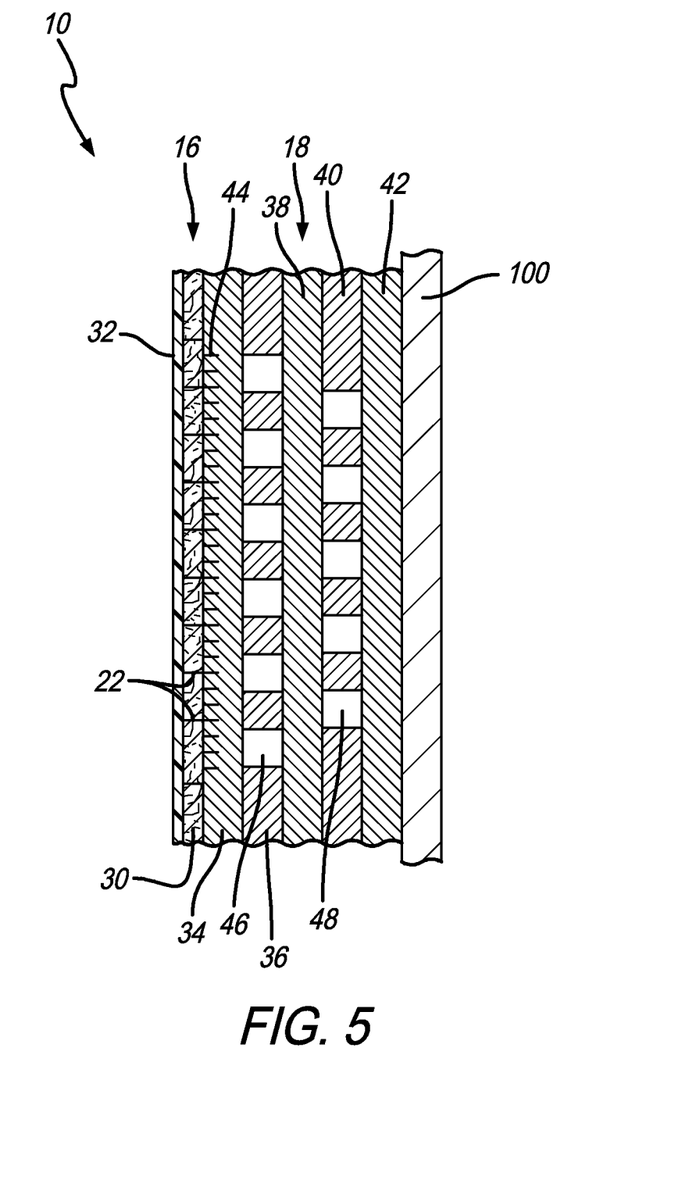
FIG. 5 is a cross-section of a crush section of the panel assembly of FIG. 1.

In a preferred embodiment the panel assembly 10 includes a front skin 16 and a core assembly 18. The front skin 16 includes front and back surfaces 16a and 16b. In a preferred embodiment, the front skin 16 has crush section portions 16c that include a cut pattern 20 therein. In a preferred embodiment, the cut pattern 20 includes horizontal cuts 22 and vertical cuts 24 that are best shown in FIGS. 4-5. The horizontal and vertical cuts 22 and 24 are arranged in a plurality of rows 26 and columns 28. As shown in FIG. 4, in a preferred embodiment, the rows 26 each include alternating horizontal cuts 22 and vertical cuts 24 in a horizontal or transverse direction and the columns 28 each include alternating horizontal cuts 22 and vertical cuts 24 in a vertical direction. The horizontal cuts 22 are spaced horizontally within a row 26 at a first distance D1 and include a vertical cut 24 therebetween. The horizontal cuts 22 are spaced vertically at a second distance D2 and are offset from one another. The horizontal cuts 22 have a length L1. The vertical cuts 24 are spaced vertically within a column 28 at a third distance D3 and include a horizontal cut 22 therebetween. The vertical cuts 24 are spaced horizontally at a fourth distance D4 and are offset from one another. The vertical cuts 24 have a length L2. In a preferred embodiment, D1 is equal to D3, D2 is equal to D4 and L1 is equal to L2. However, this is not a limitation and the distances and lengths can be different. In an exemplary embodiment, D1 is approximately 1.0 inches, D2 is approximately 1.5 inches, L1 is approximately 2.0 inches, D3 is approximately 1.0 inches, D4 is approximately 1.5 inches, and L2 is approximately 2.0 inches. However, none of these dimensions are limitations on the present invention.

In a preferred embodiment, the horizontal cuts 22 and vertical cuts 24 are made in the back surface 16b of the front skin 16, but do not extend to the front surface 16a. Preferably, the front skin 16 is a fiberglass material, other material capable of thermoforming or the like. Preferably, the horizontal cuts 22 and vertical cuts 24 are formed in the front skin 16 during the pre-preg stage of manufacturing. Preferably, the front skin 16 includes a glass weave layer 30 and a surface finish layer 32. The horizontal cuts 22 and vertical cuts 24 are made in the glass weave layer 30, thereby making the fibers in the glass weave discontinuous while preferably not affecting the surface finish layer 32 (which is preferably a resin, such as Phenolic). This provides abuse load resistance and prevents the front skin from cracking during normal wear and tear in the aircraft (e.g., a person pushing on the panel assembly or hitting the panel assembly with a bag, etc.).

Figure 2:
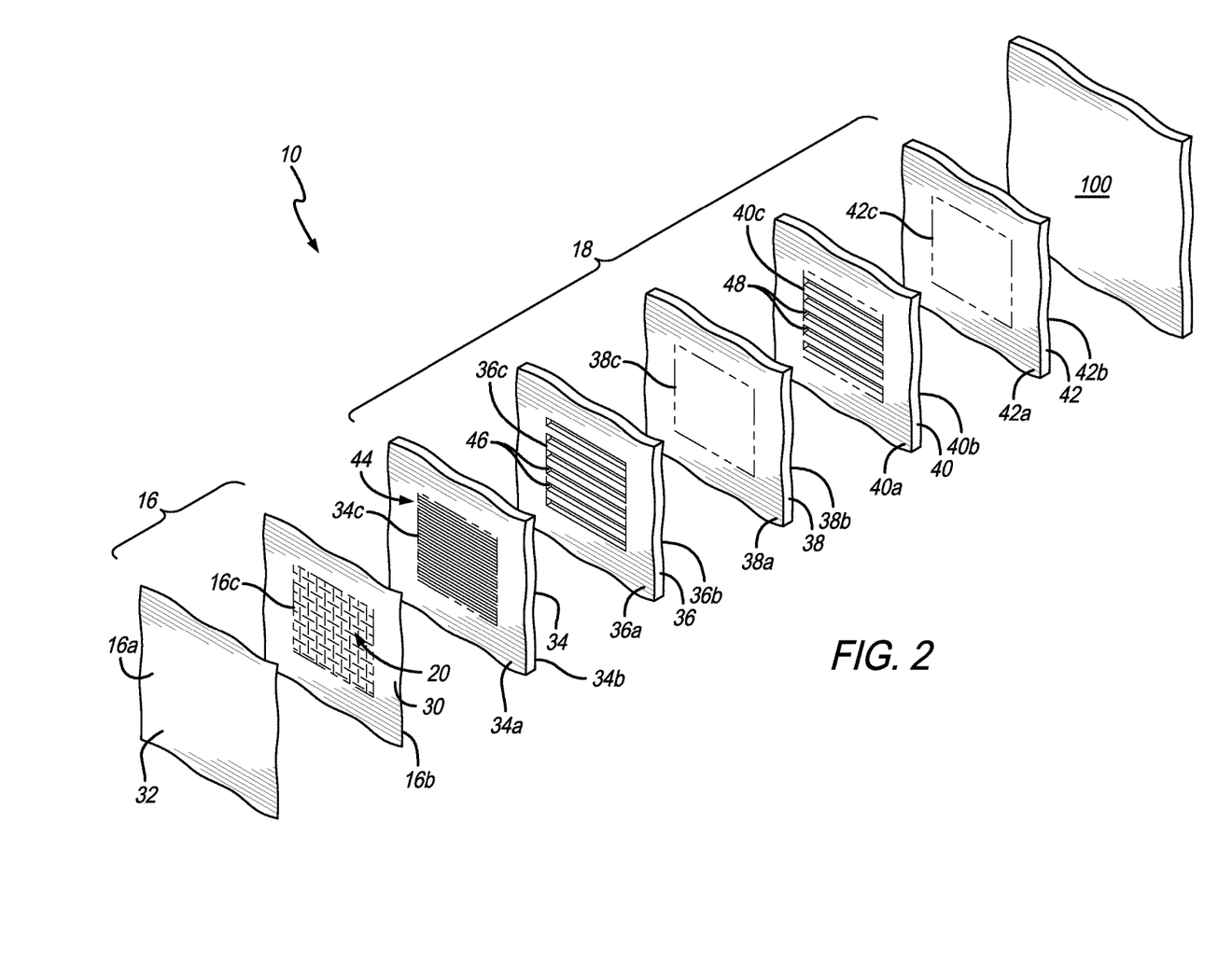
FIG. 2 is an exploded perspective view of a crush section of the panel assembly of FIG. 1.
Figure 3:
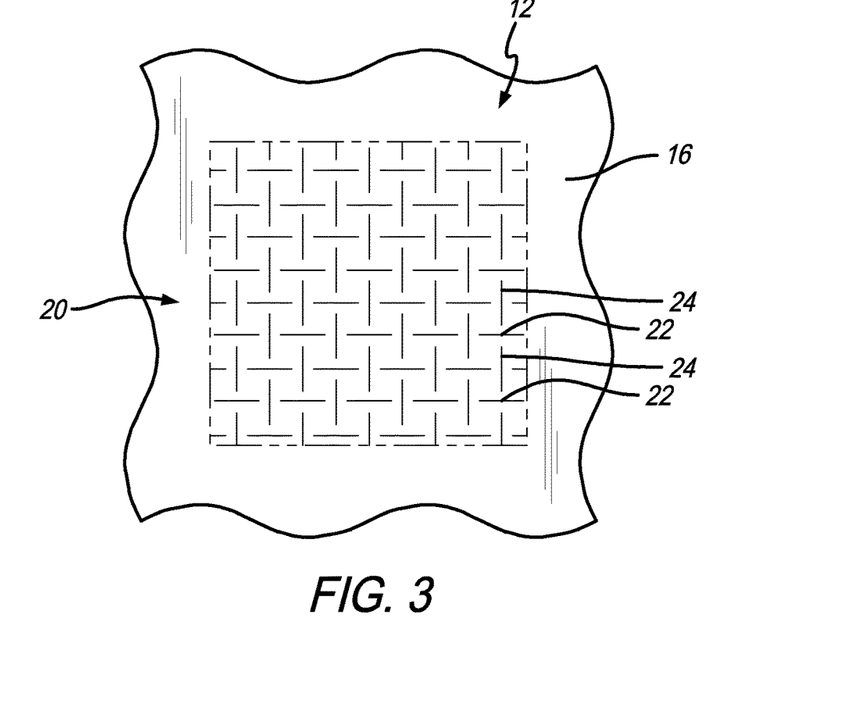
FIG. 3 is a front elevational view of a crush section of the panel assembly of FIG. 1 showing the cut pattern in the front skin.

As shown in FIGS. 2 and 5, in a preferred embodiment, the core assembly 18 includes a first layer 34 having a front surface 34a, a back surface 34b and at least one crush section portion 34c, a second layer 36 having a front surface 36a, a back surface 36b and at least one crush section portion 36c, a third layer 38 having a front surface 38a, a back surface 38b and at least one crush section portion 38c, a fourth layer 40 having a front surface 40a, a back surface 40b and at least one crush section portion 40c, and a fifth layer 42 having a front surface 42a, a back surface 42b and at least one crush section portion 42c that are all bonded/laminated together.

Within each crush section portion 34c, the front surface 34a of the first layer 34 includes a plurality of scores 44 defined therein. In a preferred embodiment, the scores 44 are parallel to one another and are oriented horizontally. However, this is not a limitation on the present invention. In another embodiment, the scores can be vertical or diagonal. In another embodiment, scores extending in different directions and with different orientations (e.g., horizontal and vertical) can be included. As shown in FIG. 5, in a preferred embodiment, the scores are formed in the front surface 34a and do not extend all the way to the back surface 34b. In another embodiment, the scores 44 can extend all the way through the first layer 34 from the front to the back. In an exemplary embodiment, the scores 44 are spaced about 0.5 inches apart and are cut about 0.25 inches deep into the first layer 34.

Within each crush section portion 36c, the second layer 36 includes a plurality of elongated voids 46 defined therein. Within each crush section portion 40c, the fourth layer 40 also includes a plurality of elongated voids 48 defined therein. In a preferred embodiment, as shown in FIG. 5, the plurality of elongated voids 48 in the fourth layer 40 are staggered vertically from the plurality of elongated voids 46 in the second layer 36. In another embodiment, the elongated voids in the different layers can be aligned. Any number of elongated voids 46 and 48 is within the scope of the invention. In another embodiment, the elongated voids can be replaced with or include rows of shorter voids, e.g., rows of square voids. Furthermore, more or less layers within the core assembly 18 are within the scope of the present invention. For example, the fourth and fifth layers can be omitted. Moreover, a back skin can be applied to the back surface of the fifth layer.

Figure 6:
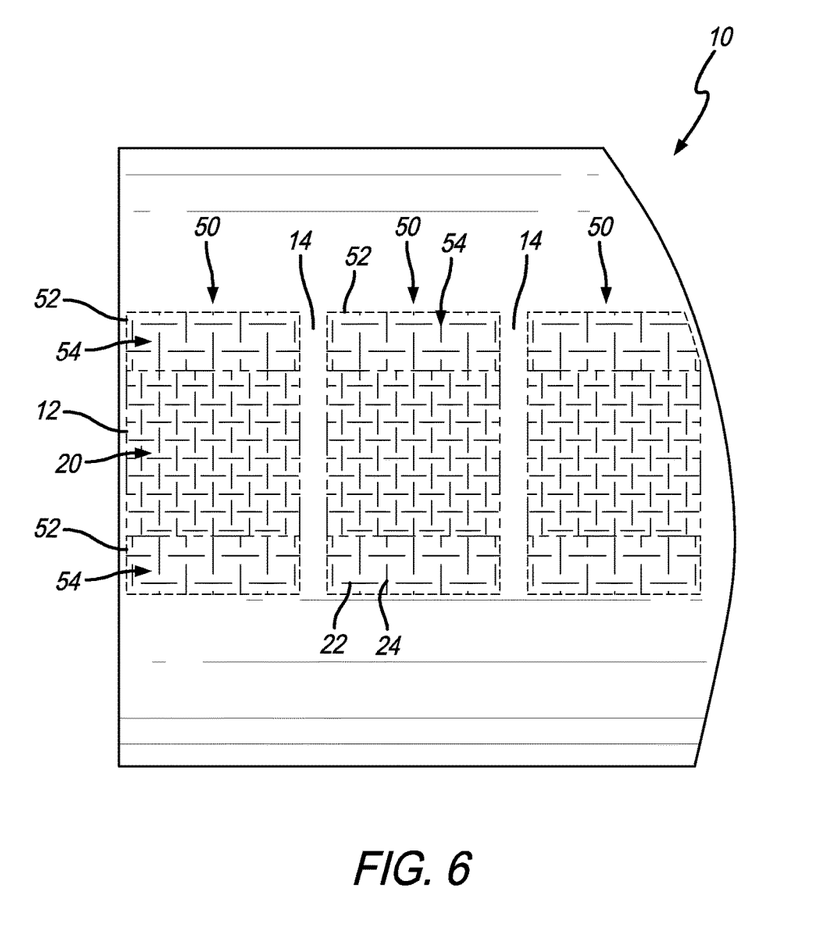
FIG. 6 is a front elevational view of a panel assembly in accordance with a preferred embodiment of the present invention.

FIG. 6 shows another embodiment of the present invention that includes a multi-pattern crush sections 50. Each multi-pattern crush section 50 includes the crush section 12 discussed above together with an area above and/or below where the horizontal and vertical cuts 22 and 24 are not as dense and the lengths of the cuts are longer (referred to as the extended crush section 52, which has a second cut pattern 54). It will be understood that this is done because the crush section 12 is the highest probability area where a head strike will occur and the extended crush section 52 is a lower probability area. In the extended crush section 52, the core assembly 18 includes can include the same density elongated voids in the second and fourth layers or the elongated voids can be less dense or defined in fewer layers.

Figure 7:
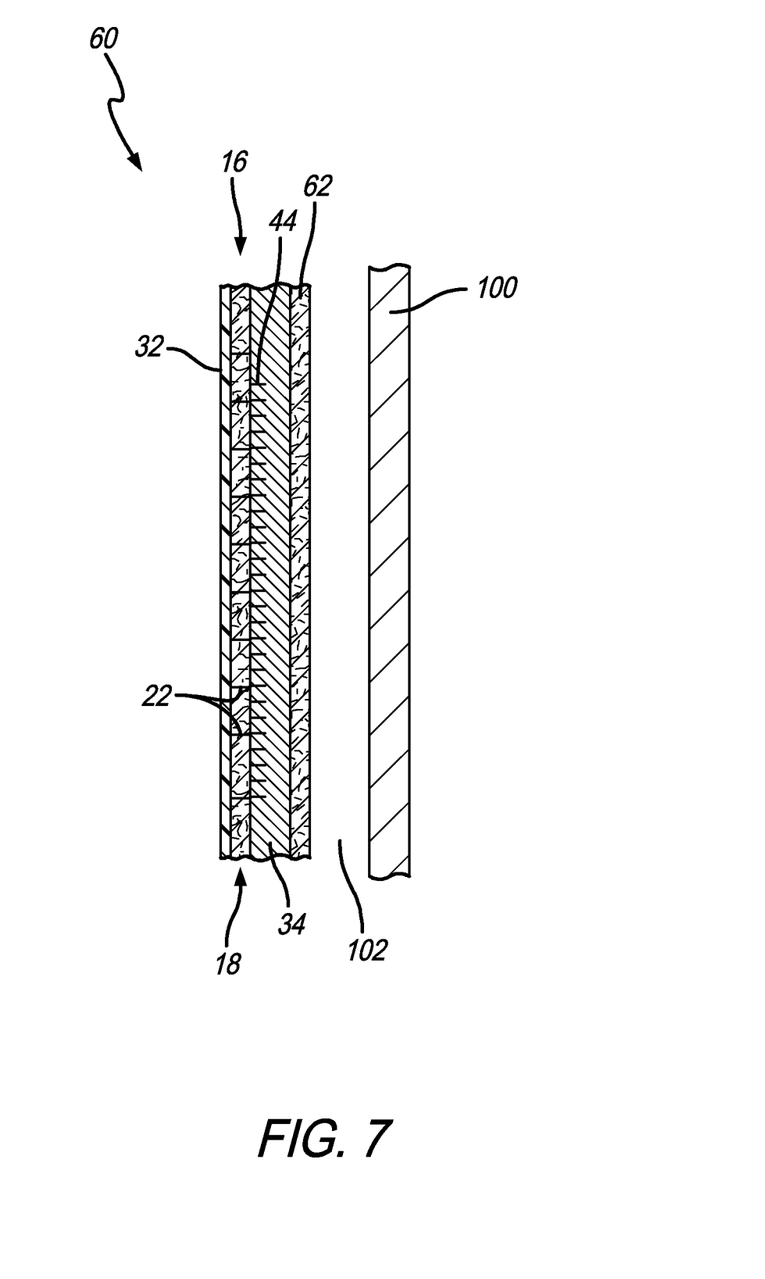
FIG. 7 is a cross-section of a crush section of a panel assembly in accordance with a preferred embodiment of the present invention.

FIG. 7 shows another embodiment of a panel assembly 60 that can be used in areas where a head strike may occur, but where the panel assembly 60 is spaced (see space 102) from a wall 100 or other object positioned therebehind. The core assembly 18 includes less layers than the core assembly 18 in the embodiment described above. Preferably, the second, third, fourth and fifth layers are omitted and the core assembly only includes first layer 34 with the scores 44 cut or defined therein. The panel assembly 60 also preferably includes a back skin 62 adhered to the back surface 34b of the first layer 34.

It will be appreciated that either panel assembly 10 or panel assembly 60 can be curved or some other form other than flat. For example, panel assembly 60 may be used in areas of seat shells or walls where curved surfaces are impacted such as business and first class suite furniture or door bustles, or for stiff connecting panels in areas such as counters and verticals in galleys.

Space 102 basically a buffer zone, which is an area behind the panel assembly 60 with relatively flexible or dynamically movable items (such as a class divider, a closet or the plumbing in the back of many galleys). It will be appreciated that, based on regulations, the buffer zone may be able to be reduced in an area with rigid backing (such as some drink carts that have no galley clearance) if the panel assembly 10 itself is thickened to at least two inches.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A panel assembly comprising:
    a front skin having a front surface, a back surface and at least one crush section portion,
    a core assembly that includes first, second, third, fourth and fifth layers laminated together,
    a first crush section, and
    a second crush section,
    wherein the first layer has a front surface, a back surface and at least one crush section portion, wherein the second layer has a front surface, a back surface and at least one crush section portion, wherein the front surface of the second layer is bonded to the back surface of the first layer, wherein the third layer has a front surface, a back surface and at least one crush section portion, wherein the front surface of the third layer is bonded to the back surface of the second layer, wherein the fourth layer has a front surface, a back surface and at least one crush section portion, wherein the front surface of the fourth layer is bonded to the back surface of the third layer, wherein the fifth layer has a front surface, a back surface and at least one crush section portion, and wherein the front surface of the fifth layer is bonded to the back surface of the fourth layer,
    wherein the front surface of the first layer includes a plurality of scores defined therein, wherein the second layer includes a plurality of elongated voids defined therein, and wherein the fourth layer includes a plurality of elongated voids defined therein,
    wherein, within the second crush section, the front surface of the first layer of the core assembly includes a plurality of scores defined therein, wherein the second layer includes a plurality of elongated voids defined therein, and wherein the fourth layer includes a plurality of elongated voids defined therein, and
    wherein the first crush section and the second crush section are separated horizontally by a non-crush section.

2. The panel assembly of claim 1 wherein within the first crush section, the front skin includes a first cut pattern that comprises a plurality of horizontal and vertical cuts formed therein.

3. The panel assembly of claim 2 wherein the plurality of horizontal and vertical cuts form a plurality of rows and columns.

4. The panel assembly of claim 3 wherein each row includes alternating horizontal and vertical cuts.

5. The panel assembly of claim 4 wherein each column includes alternating horizontal and vertical cuts.

6. The panel assembly of claim 5 wherein the front skin includes a glass weave layer and a surface finish layer, and wherein the horizontal and vertical cuts are made in the glass weave layer.

7. The panel assembly of claim 1 wherein the plurality of scores in the front surface of the first layer are positioned within the crush section portion.

8. The panel assembly of claim 7 wherein the plurality of scores in the front surface of the first layer extend generally parallel to one another.

9. The panel assembly of claim 8 wherein the plurality of scores in the front surface of the first layer extend generally horizontally.

10. The panel assembly of claim 1 wherein the plurality of elongated voids in the fourth layer are staggered vertically from the plurality of elongated voids in the second layer.

11. The panel assembly of claim 2 further comprising at least a first extended crush section that includes a second cut pattern that comprises a plurality of horizontal and vertical cuts formed therein, and wherein the horizontal and vertical cuts of the second cut pattern are not as dense as the horizontal and vertical cuts in the first cut pattern.

12. A panel assembly comprising:
    a front skin having a front surface, a back surface and at least one crush section portion, wherein within the at least one crush section portion, the front skin includes a cut pattern that comprises a plurality of horizontal and vertical cuts formed therein, wherein the plurality of horizontal and vertical cuts form a plurality of rows and columns, wherein each row includes alternating horizontal and vertical cuts, and wherein each column includes alternating horizontal and vertical cuts,
    a core assembly that includes first, second, third, fourth and fifth layers laminated together,
    a first crush section, and
    a second crush section,
    wherein the first layer has a front surface, a back surface and at least one crush section portion, wherein the second layer has a front surface, a back surface and at least one crush section portion, wherein the front surface of the second layer is bonded to the back surface of the first layer, wherein the third layer has a front surface, a back surface and at least one crush section portion, wherein the front surface of the third layer is bonded to the back surface of the second layer, wherein the fourth layer has a front surface, a back surface and at least one crush section portion, wherein the front surface of the fourth layer is bonded to the back surface of the third layer, wherein the fifth layer has a front surface, a back surface and at least one crush section portion, and wherein the front surface of the fifth layer is bonded to the back surface of the fourth layer, wherein the front surface of the first layer includes a plurality of horizontally extending scores defined within the crush section portion, wherein the second layer includes a plurality of elongated voids defined therein, wherein the fourth layer includes a plurality of elongated voids defined therein, wherein the plurality of elongated voids in the fourth layer are staggered vertically from the plurality of elongated voids in the second layer, wherein, within the second crush section, the front surface of the first layer of the core assembly includes a plurality of scores defined therein, wherein the second layer includes a plurality of elongated voids defined therein, and wherein the fourth layer includes a plurality of elongated voids defined therein, wherein the first crush section and the second crush section are separated horizontally by a non-crush section.

13. The panel assembly of claim 12 wherein the front skin includes a glass weave layer and a surface finish layer, and wherein the horizontal and vertical cuts are made in the glass weave layer.

14. A panel assembly comprising:
a front skin having a front surface, a back surface and at least one crush section portion,
a core assembly that includes at least a first layer, and
a first crush section, and
an extended crush section,
wherein the first layer has a front surface, a back surface and at least one crush section portion, wherein the front surface of the first layer includes a plurality of scores defined therein,
wherein, within the first crush section, the front skin includes a first cut pattern that comprises a plurality of horizontal and vertical cuts formed therein,
wherein the extended crush section includes a second cut pattern that comprises a plurality of horizontal and vertical cuts formed therein, and wherein the horizontal and vertical cuts of the second cut pattern are not as dense as the horizontal and vertical cuts in the first cut pattern.

15. The panel assembly of claim 14 wherein the plurality of horizontal and vertical cuts form a plurality of rows and columns.

16. The panel assembly of claim 15 wherein each row includes alternating horizontal and vertical cuts.

17. The panel assembly of claim 16 wherein each column includes alternating horizontal and vertical cuts.

18. The panel assembly of claim 17 wherein the front skin includes a glass weave layer and a surface finish layer, and wherein the horizontal and vertical cuts are made in the glass weave layer.

19. The panel assembly of claim 14 wherein the plurality of scores in the front surface of the first layer are positioned within the crush section portion.

20. The panel assembly of claim 19 wherein the plurality of scores in the front surface of the first layer extend generally parallel to one another.

21. The panel assembly of claim 20 wherein the plurality of scores in the front surface of the first layer extend generally horizontally.

22. A method of forming the panel assembly according to claim 1, the method comprising:
providing a prepreg sheet,
forming a first crush section comprising a cut pattern in the prepreg sheet,
forming a second crush section comprising a cut pattern in the prepreg sheet,
heat-treating the prepreg sheet to form a front skin layer having a front surface and a back surface,
providing a core assembly having a plurality of layers including a first layer,
wherein the first layer has a front surface, a back surface, and at least one crush section portion,
forming a plurality of scores in the front surface of the first layer,
forming a plurality of elongated voids in at least one layer of the core assembly,
bonding the back surface of the front skin layer to the front surface of the first layer,
wherein the first crush section and the second crush section are separated horizontally by a non-crush section.

* * * * *